United States Patent
Pandey et al.

(10) Patent No.: US 10,873,586 B2
(45) Date of Patent: Dec. 22, 2020

(54) SYSTEMS AND METHODS FOR SECURE DATA ACCESS CONTROL

(71) Applicant: Capital One Services, LLC, McLean, VA (US)

(72) Inventors: Suresh Pandey, McKinney, TX (US); Sebastian Smith, Plano, TX (US); Hala Salim El-Ali, Murphy, TX (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/358,106

(22) Filed: Mar. 19, 2019

(65) Prior Publication Data

US 2020/0304507 A1  Sep. 24, 2020

(51) Int. Cl.
| | |
|---|---|
| *H04L 29/06* | (2006.01) |
| *G06F 21/62* | (2013.01) |
| *G06F 9/455* | (2018.01) |
| *G06F 3/06* | (2006.01) |
| *H04L 9/06* | (2006.01) |

(52) U.S. Cl.
CPC ............ *H04L 63/102* (2013.01); *G06F 3/067* (2013.01); *G06F 3/0622* (2013.01); *G06F 3/0664* (2013.01); *G06F 9/45558* (2013.01); *G06F 21/6245* (2013.01); *H04L 9/0643* (2013.01); *H04L 63/062* (2013.01); *H04L 63/08* (2013.01); *G06F 2009/45587* (2013.01)

(58) Field of Classification Search
CPC .................................................. H04L 63/102
See application file for complete search history.

(56) References Cited

U.S. PATENT DOCUMENTS

| | | | |
|---|---|---|---|
| 9,292,673 B2 | 3/2016 | Rutkowski et al. | |
| 9,749,299 B1* | 8/2017 | Sokolov | H04L 63/0428 |
| 10,121,021 B1 | 11/2018 | Fonseka et al. | |
| 10,135,974 B1* | 11/2018 | Liu | H04M 3/42161 |
| 2006/0259984 A1* | 11/2006 | Juneau | H04L 67/18 726/28 |
| 2007/0143398 A1* | 6/2007 | Graham | G06Q 40/02 709/204 |
| 2008/0172598 A1* | 7/2008 | Jacobsen | H04L 63/12 715/224 |
| 2009/0300356 A1* | 12/2009 | Crandell | G06F 21/32 713/170 |
| 2012/0216052 A1* | 8/2012 | Dunn | G06F 21/78 713/193 |
| 2014/0032228 A1 | 1/2014 | Johri et al. | |
| 2014/0201824 A1* | 7/2014 | Agbabian | G06F 21/6245 726/6 |

(Continued)

*Primary Examiner* — Jason Chiang
(74) *Attorney, Agent, or Firm* — Bookoff McAndrews, PLLC

(57) ABSTRACT

A computer system for secure data access control, according to some examples, may perform operations including: receiving first data from a first client associated with a first user; using a first data access agent to store the first data in a first data store, the first data access agent having access to the first data store and not having access to a second data store; receiving second data from a second client associated with a second user; and using a second data access agent to store the second data in the second data store, the second data access agent having access to the second data store and not having access to the first data store.

20 Claims, 5 Drawing Sheets

(56) References Cited

U.S. PATENT DOCUMENTS

| | | |
|---|---|---|
| 2015/0235014 A1 | 8/2015 | Evans et al. |
| 2016/0234209 A1* | 8/2016 | Kahol .................. G06F 16/958 |
| 2017/0169249 A1* | 6/2017 | de Oliveira ......... G06F 21/6245 |
| 2017/0177625 A1* | 6/2017 | Lam ...................... G06F 16/213 |
| 2017/0237717 A1* | 8/2017 | Starosielsky ....... H04L 63/0435 |
| | | 713/176 |
| 2018/0159856 A1* | 6/2018 | Gujarathi ............ H04L 63/0281 |
| 2019/0095241 A1* | 3/2019 | Ago ...................... G06F 9/5005 |
| 2019/0098014 A1* | 3/2019 | Harrison ............. H04L 63/0492 |
| 2019/0130128 A1* | 5/2019 | Khassanov ........... H04L 63/101 |
| 2019/0166110 A1* | 5/2019 | Miu ...................... H04L 63/105 |

\* cited by examiner

SYSTEMS AND METHODS FOR SECURE DATA ACCESS CONTROL

TECHNICAL FIELD

Various embodiments of the present disclosure relate generally to secure data access control architectures and, more particularly, to secure data access control for multi-tenant architectures.

BACKGROUND

In a multi-tenant architecture, a single application may serve multiple users. In multi-tenant architectures, computing or storage resources may be shared, resulting in comingling of data stored for different users. Therefore, in order to provide security to data that is stored, there is a need for effective data access control schemes.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for secure data access control.

For instance, a computer system may include a memory storing instructions; and one or more processors configured to execute the instructions to perform operations. The operations may include: receiving first data from a first client associated with a first user; using a first data access agent to store the first data in a first data store, the first data access agent having access to the first data store and not having access to a second data store; receiving second data from a second client associated with a second user; and using a second data access agent to store the second data in the second data store, the second data access agent having access to the second data store and not having access to the first data store.

Furthermore, a method may include: receiving, from a client associated with a user, a request to retrieve data; based on the request, determining an identifier of the user; based on the identifier, identifying, from a plurality of data access agents, a data access agent having permission to access a data store in which the data is stored; invoking the identified data access agent so that the identified data access agent retrieves the data; and transmitting the data to the client.

Furthermore, a computer system may include a memory storing instructions and one or more processors configured to execute the instructions to perform operations. The operations may include: generating a user-specific identifier for a user; creating a data store and an access account that has permission to access the data store and does not have permission to access data stores created for other users; creating a user-specific data access agent corresponding to the user, the data access agent having the access account and being one of a plurality of data access agents; receiving, from a client associated with the user, a request to store data; based on the request, determining an identifier of the user as being the user-specific identifier; based on the user-specific identifier, identifying, from the plurality of data access agents, the user-specific data access agent; and invoking the user-specific data access agent so that the user-specific data access agent stores the data in the data store.

According to additional aspects of the disclosure, a non-transitory computer-readable medium stores instructions that, when executed by one or more processors, cause the one or more processors to perform the aforementioned computer-implemented method or the operations that the aforementioned computer systems are configured to perform.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, different data stores are used to store data for different users. Each of the data stores may be made accessible only to a particular data access agent. In order to access the data store, a routing application, which is unable to directly access the data stores, is used to invoke the appropriate data access agent such that the data access agent accesses the respective data store on behalf of the routing application. According to such features, and additional features discussed below, it is possible to realize effective isolation of data stored for different users.

Figure 1:
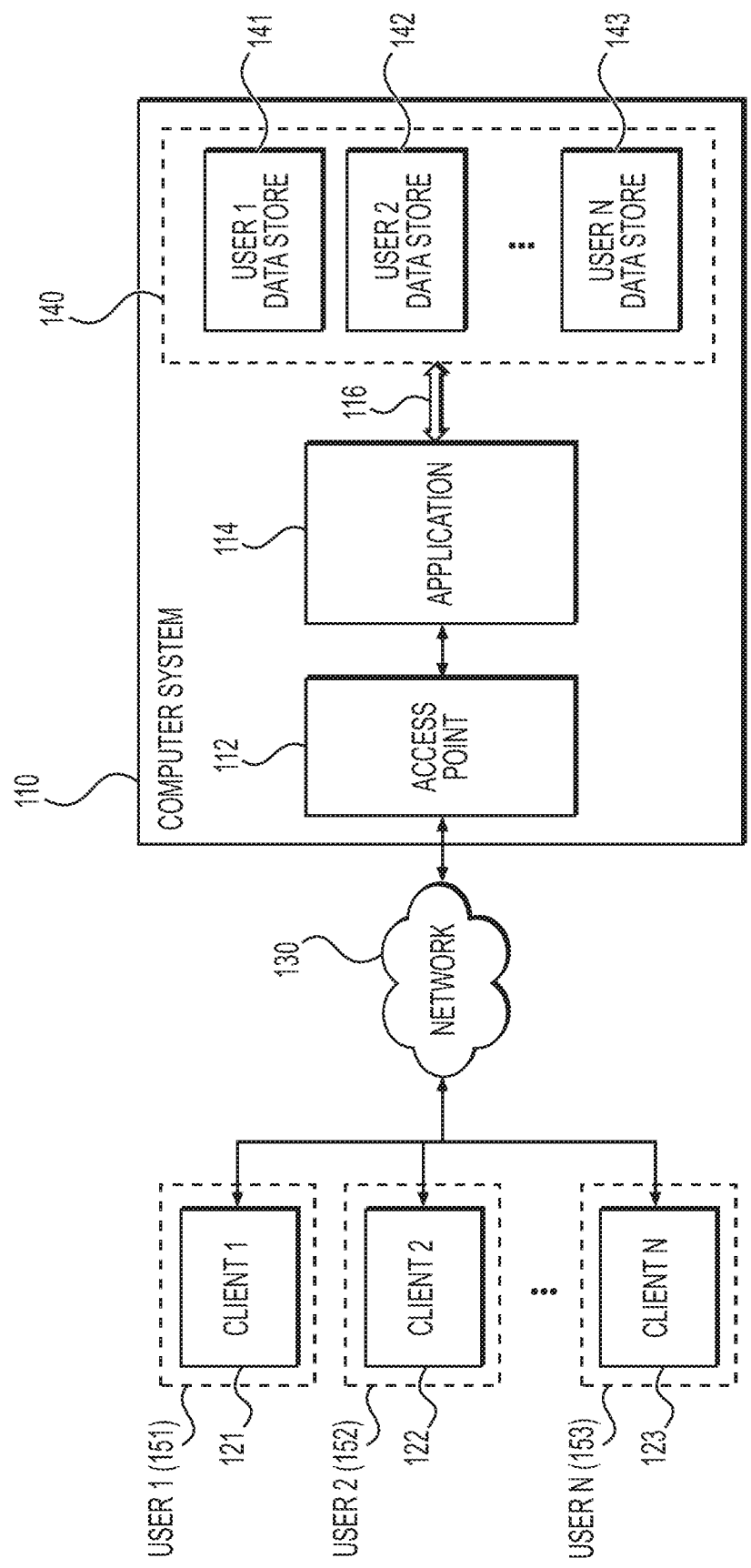
FIG. 1 illustrates an example of a system environment, according to one or more embodiments.

FIG. 1 illustrates an example of a system environment, according to one or more embodiments. As shown, the system environment may include a computer system 110 connected to clients 121, 122, and 123 over a network 130. Clients 121, 122, and 123 may each be a computer system configured to transmit data to, and/or receive data from, the computer system 110 over the network 130. In general, a computer system, such as computer system 110 and a client computer system, may include one or more computing devices as described in connection with FIG. 5, below. Therefore, a client, such as any of clients 121, 122, and 123, may also be referred to as a client device or a client system. Clients 121, 122, and 123 may be respectively associated with users 151, 152, and 153, as described in further detail below.

Users 151, 152, and 153 may be any combination of personal and/or institutional users that respectively use or operate clients 121, 122, and 123. A user, such as any of the users 151, 152, and 153, may also be referred to as a party. An institutional user may be a company or other organization. As will be discussed below, in some examples, users 151, 152, and 153 may be partner companies of the entity operating the computer system 110. The number of users and corresponding clients may be any number. In FIG. 1, the label "N" for user 153 represents an arbitrary number of users.

Computer system 110 may be a server system operating an application 114 that provides a resource or service for clients 121, 122, and 123. Such resource or service may be utilized by the users 151, 152, and 153. Application 114 may be implemented in a multi-tenant architecture to serve multiple users 151, 152 and 153 by serving the clients 121, 122, and 123 respectively operated by the users 151, 152 and 153. In the context of multi-tenancy, a "tenant" may be understood as a user, such as users 151, 152, and 153. The clients 121, 122, and 123 may interface with the application 114 through an access point 112 operated by computer system 110.

The computer system 110 may operate data stores 140, which may also be referred to as user data stores or user-specific data stores. Data stores 140 may include data stores 141, 142, and 143, which may store data associated with users 151, 152, and 153, respectively. Such data, which may also be referred to as data records or data objects, may include sensitive information that is private to the respective user. For example, data store 141 may store data that is private to user 151, and data store 142 may store data that is private to user 152. Application 114 may access the data stores 140 through a data access architecture 116, which is described below in more detail.

The data stores 140 may be any type of data store. Examples of data stores include cloud storage resources, file systems, and databases (e.g., relational databases and NoSQL databases). A plurality of different data stores (e.g., data stores 141, 142, and 143 being different respective data stores) may be implemented as, for example, different respective cloud storage resources, different respective folders of a file system, and/or different respective schema of a database. While the data stores 141, 142, and 143 may be logically separate from one another, the data stores 141, 142, and 143 are not required to be physically separate from one another.

For an arbitrary number of users 151, 152, and 152, the data stores 140 may include at least the same number of data stores. In some examples, users 151, 152, and 152 and data stores 141, 142, and 143 may have a one-to-one correspondence such that there are N data stores for N users, as illustrated in FIG. 1. However, it is also possible for there to be more than one data store for a particular user.

In some examples, the computer system 110 may operate a cloud computing platform with scalable resources for computation and/or data storage, and may include a hardware infrastructure configured to implement the cloud computing platform, such as a plurality of computing devices in a cloud computing network. In such examples, the access point 112, application 114, and the data stores 140 may be implemented on the cloud computing platform. Amazon Web Services (AWS) is discussed in this disclosure as a non-limiting example of a cloud computing provider. For example, in an implementation using AWS, the application 114 may run on an elastic compute cloud (EC2), and the data stores 140 may each be implemented as an AWS Simple Storage Service (S3) bucket, which is an example of a cloud storage resource. Each data store 140 may be a different respective bucket. Examples of other cloud computing providers include Microsoft Azure and Google Cloud. It is noted, however, that the present disclosure is not limited to cloud-computing implementations.

The access point 112 may be implemented in any suitable manner. In some implementations, the access point 112 may be implemented as an API gateway. Such an API gateway may be, for example, configured to receive hypertext transfer protocol (HTTP) messages from the clients 121, 122, 123. Additionally, the access point 112 may be involved in authentication of the clients 121, 122, and 123, in which case the access point 112 may be referred to as an authentication access point. For example, access point 112 may be an API gateway that functions as a resource server and/or authorization server.

Network 130 may be any suitable network or combination of networks. Network 130 may support any appropriate protocol suitable for communication of data to and from the computer system 110. Network 130 may include a public network (e.g., the internet), a private network (e.g., a network within an organization), or a combination of public and/or private networks.

The system environment of FIG. 1 may be implemented in a variety of different contexts and applications, and is not limited to any particular industry. In some examples, computer system 110 may be operated by an entity that holds sensitive information in the data stores 140. For example, the entity operating computer system 110 may be a financial institution or other organization that provides a multi-lender platform. In example applications for the automobile retailing industry, the multi-lender platform may serve as a mediator between dealers that retail automobiles, and lenders that offer financing to consumers seeking to purchase or lease an automobile. The multi-lender platform may therefore permit consumers to review a selection of loan products from different lenders on, for example, a website. In such examples, application 114 may be a server application that provides services, such as a website or API for lenders, dealers, and consumers. Such lenders, dealers, and/or consumers may therefore constitute the users 151, 152, and 153. For example, at least some of the users 151, 152, and 153 may each be a lender, such as a bank, that is participating in the multi-lender platform as a partner. These users may rely on the computer system 110 to store confidential or sensitive information, such as customer profiles and credit information, financial account information, and customer transactions data.

Since users, such as partner banks in the above example, may be competitors with one another, there is a need for data stored in data stores 140 to be kept secure, while still permitting application 114 to access the data stored in the data stores 140.

One example approach to providing application 114 with access to the data in data stores 141, 142, and 143 is to make the data stores 141, 142, and 143 all accessible to an access account that is run by the application 114. In this context, an access account may be a set of permissions, such as a set of identity access management (IAM) permissions, allocated to the application 114. For example, in AWS implementations, an access account may be in the form of an IAM role that is assumed by the application 114 or a service (e.g., an EC2 instance) that runs the application 114. In such examples, the data stores 141, 142, and 143 may all be configured to be accessible by the IAM role assumed by the application 114. Data access control may be implemented in an authorization layer on top of the data, to restrict users to accessing only the data they are authorized to access.

However, even with access control implemented in the authorization layer, the above example approach, in which the application 114 has an access account that can access all the data stores 141, 142, and 143, might not result in sufficient data security for the following reasons. First, a breach of the access credentials for one user may expose data stored for other users. Second, if a user, such as a partner institution, decides to end its relationship with the entity operating the computer system 110, clean removal of data stored for that user may be difficult. Third, the example approach described above might not have sufficient security features directed toward isolating data stores 141, 142, and 143 for audit purposes. Furthermore, if data stored in data stores 141, 142, and 143 are encrypted with the same key, a single breach of encryption key may expose all data stores. These potential challenges may be addressed by the architecture discussed below.

Figure 2:
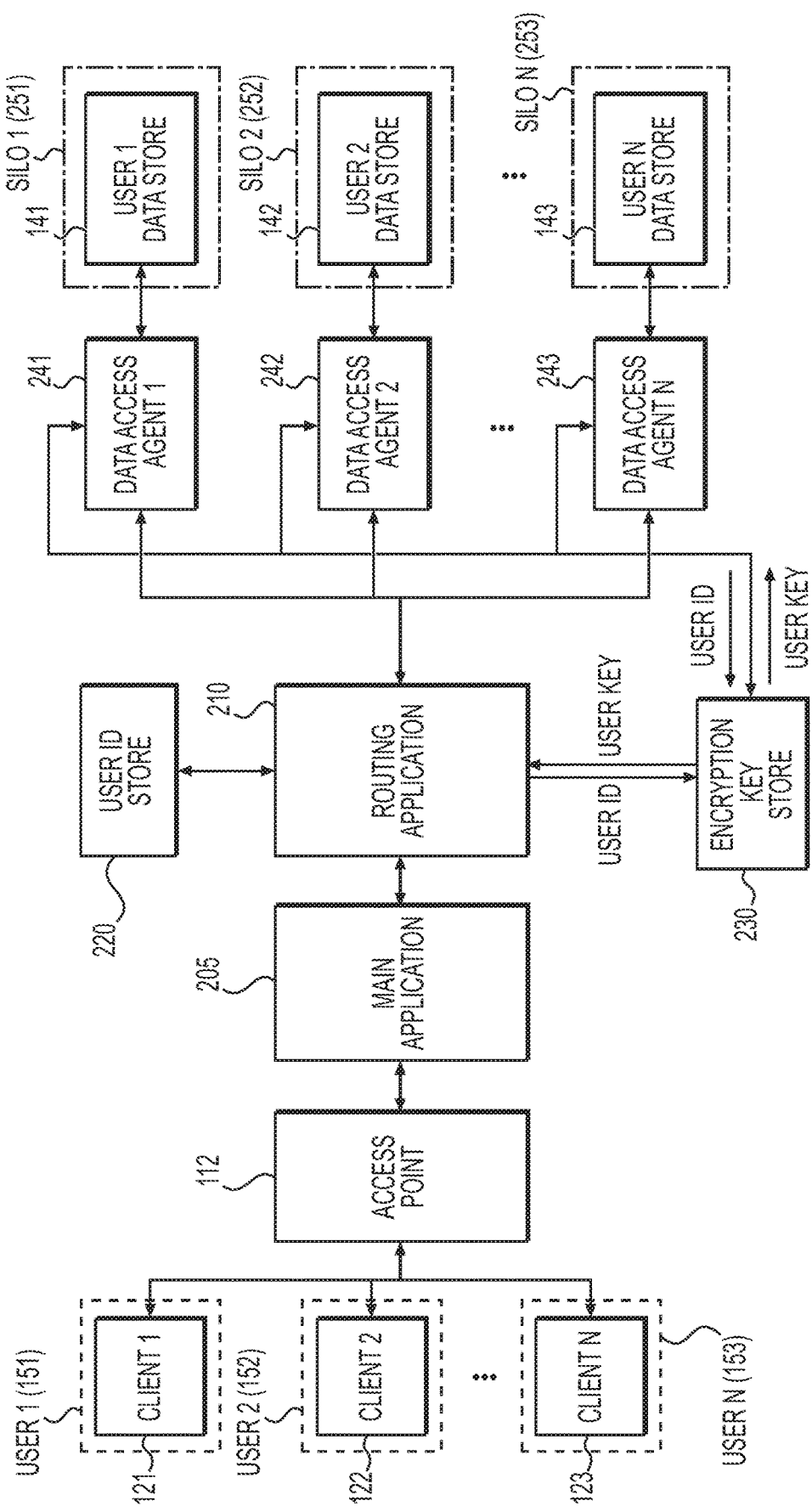
FIG. 2 illustrates an example of a multi-tenant architecture having secure data access control, according to one or more embodiments of the present disclosure.

FIG. 2 is a diagram illustrating an example of a multi-tenant architecture having secure data access control, according to one or more embodiments of the present disclosure. The components shown in FIG. 2 other than the clients 121, 122, and 123 and their users 151, 152, and 153 may be features implemented by the computer system 110 of FIG. 1. For example, the computer system 110 may include a memory storing instructions, and one or more processors configured to execute the instructions to implement the functionalities of these components. The components shown in FIG. 2, other than the clients 121, 122, and 123 and their users 151, 152, and 153, may collectively be referred to as a secure data access control architecture or secure access control architecture.

In FIG. 2, main application 205 may correspond to application 114 of FIG. 1, and may have any or all of the features described above for application 114. Main application 205 may be implemented in a multi-tenant architecture in which main application 205 utilizes data stores 141, 142, and 143 to respectively provide a resource or service to clients 121, 122, and 123. In some examples, main application 205 is a microservice, and may exist alongside other microservices operated by the computer system 110. In such examples, main application 205 and other microservices may each be accessible through the access point 112, which may be an API gateway, as described above.

The architecture illustrated in FIG. 2 may further include a routing application 210, a user ID store 220, an encryption key store 230, and data access agents 241, 242, and 243. The data access agents 241, 242, and 243 may be respectively implemented for users 151, 152, and 153. The components in FIG. 2 that are situated between the main application 205 and the data stores 141, 142 and 143 (e.g., the routing application 210, the user ID store 220, the encryption key store 230, and the data access agents 241, 242, and 243) may be understood as an example of the data access architecture 116 illustrated in FIG. 1.

Data access agents 241, 242, and 243 may each be a user-specific data access agent having access to the data store(s) associated with a specific user, while not having access to any of the data stores 140 associated with any other user. For example, data access agent 241 may have access to data store 141 associated with user 151, but not have access to data stores 142 and 143 associated with other users. Similarly, data access agent 242 may have access to data store 142 associated with user 152, but not have access to data stores 141 and 143 associated with other users. Having access to a data store may be understood as having the ability to access the data store to read data from the data store, write data to the data store, and/or modify (e.g., update and/or delete) data already stored in the data store. Not having access to a data store may be understood as not having any access permissions for that data store, e.g., having neither read access, write access, data modification access, nor any other type of access.

The routing application 210 is used to invoke the data access agents 241, 242, and 243. The main application 205 may be configured not to have direct access to any of the data stores 141, 142, and 143. Instead of direct access, the main application 205 may obtain data from the data stores 140 or store data in the data stores 140 by using the routing application 210 to invoke the appropriate data access agent to perform data retrieval or storage.

The routing application 210 may similarly be configured not to have direct access to any of the data stores 141, 142, and 143. The routing application 210 instead invokes the data access agents 241, 242, and 243, which in turn access the data stores 141, 142, and 143, respectively. Therefore, the routing application 210 may serve as an intermediary between the main application 205 and the data access agents 241, 242, and 243. As an intermediary, the routing application 210 may relay payload data, such as data that is to be stored in the data stores 141, 142, and 143 or data that has been retrieved from the data stores 141, 142, and 143, between the main application 205 and the data access agents 241, 242, and 243. According to the configuration described above, the data stores 141, 142, and 143 are isolated from one another, so as to implement user-specific silos 251, 252 and 253.

While FIG. 2 illustrates the routing application 210 as being separate from the main application 205, it is also possible for the routing application 210 and the main application 205 to be the same application, in which case the functionalities of the routing application 210 described in this disclosure may be included in the functionalities of the main application 205.

In general, data access agents 241, 242, and 243 may be applications and/or processes configured to perform their functionalities as described herein. In some examples, the architecture shown in FIG. 2 is implemented on a cloud computing platform, such as AWS. In such implementations, the data access agents 241, 242, and 243 and the routing application 210 may each be a compute or a function executed on the compute. Examples of computes include AWS Lambda and other serverless computes. For example, the data access agents 241, 242, and 243 may each be an AWS Lambda having a lambda function configured to carry out the functionalities of the data access agent.

Access or lack of access to a certain data store may be implemented by access accounts having permissions corresponding to the access or lack of access. For example, data access agent 241 may run an access account having permission to read data from data store 141 and write data to data store 141, while not having permission to either read data from data store 142 or write data to data store 142. In some examples, an access account may be a set of identity access management (IAM) permissions that is allocated to the data access agent 241, 242, or 243 or the routing application 210. The specific characteristics of the access account may depend on the particular implementation of the data stores 141, 142, and 143.

In implementations using AWS and other similar platforms, the access accounts may each be in the form of an IAM role that is assumed by a data access agent. In such implementations, data access agents 241, 242, and 243 may each be given a different IAM role. The IAM role of a certain data access agent may have a permission policy specifying that the respective data access agent has access to a data store associated with a particular user, and does not have access to other data stores associated with other users. Additionally, the routing application 210 may have an IAM role that is different from the IAM roles of the data access agents. The IAM role of the routing application 210 may be configured such that the routing application 210 does not have direct access to any of the data stores 140, but is capable of invoking the data access agents 241, 242, and 243 so that the data access accesses the respective data stores 141, 142, and 143 on behalf of the routing application 210.

If the data stores 141, 142, and 143 are implemented as different respective folders on a file system storage, then access accounts may each be a set of file system permissions. For example, the data access agent 241, 242, and 243 may each be a process or application having read and/or write permissions to the folder implementing the respective data store 141, 142, or 143, but having neither read nor write permission for other data stores. Similarly, the routing application may have neither read nor write permission for any of the data stores 141, 142, or 143.

If the data stores 141, 142, and 143 are implemented as different schema of a database, then access accounts may be implemented as user accounts having an appropriate set of permissions.

In the architecture shown in FIG. 2, each user 151, 152, 153 may be represented by a user identifier, such as a user ID. Each user ID may be a unique identifier that is used internally by the computer system 110. For example, user 151 may have an identifier "P1," and user 152 may have an identifier "P2." The user ID store 220 may be a database or other data store that stores user IDs in a manner that associates user IDs with an identifier that is used in communications sent from the clients 121, 122 and 123.

Communications sent from clients 121, 122 or 123 may utilize an authentication protocol, in which case the aforementioned identifier that is used in the communication may be as referred to as an authentication protocol identifier. For example, the authentication protocol may be an OAuth protocol, and the authentication protocol identifier may be an OAuth client ID. As noted above, access point 112 may be an API gateway that functions as a resource server and/or authorization server.

For example, client 121 may be operated by user 151 to send a request to the computer system 110. This request, which is received by the access point 112, may include an authentication protocol identifier associated with the client 121. The authentication protocol identifier may be, for example, an OAuth client ID having a value of "e483192a814d11e8adc." The request may be received by the main application 205, which may forward the request to the routing application 210. Alternatively, the main application 205 may generate a new request based on the request received from the client 121, and this new request may likewise contain the same authentication protocol identifier. The routing application 210 may then use the authentication protocol identifier to retrieve the corresponding user ID from the user ID store 220.

The user ID store 220 may store user IDs and authentication protocol identifiers in a manner that associates a user ID with each authentication protocol identifier. Accordingly, a user ID can be identified for a given authentication protocol identifier. For example, the user ID store 220 may associate the authentication protocol identifier of "e483192a814d11e8adc" with user ID "P1." If client 122 has an authentication protocol identifier of "f0131ccc-814d11e8adc," then the table may similarly associate the authentication protocol identifier of "f0131ccc-814d11e8adc" with user ID "P2." This association may also be referred to as a mapping between the authentication protocol identifiers and their corresponding user IDs. Such mapping may be stored in the form of a table, which may be structured so that each row of the table has an authentication protocol identifier and the corresponding user ID.

For a given user, the corresponding authentication protocol identifier may change over time or upon subsequent interactions between the user and the computer system 110. Furthermore, as described above, a client may be a computing device or computer system that is operated by the user. Therefore, the clients 121, 122, and 123, are not necessarily fixed, but may be any computing device or computer system used by the users 151, 152, and 153 to interact with the computer system 110. Thus, a single user may interact with the computer system 110 through multiple clients, and each client may have a different authentication protocol identifier. Therefore, the mapping between the authentication protocol identifiers and user IDs that are stored in user ID store 220 may be updated to keep up with changes to the authentication protocol identifiers. While the corresponding the authentication protocol identifier may change, the user ID may remain constant. Furthermore, since a single user may interact with the computer system 110 through multiple clients, multiple authentication protocol identifiers may be corresponded to the same user ID.

In the architecture shown in FIG. 2, the routing application 210 and the data access agents 241, 242, and 243 may utilize encryption keys for additional security measures. Such encryption keys may be user-specific, and may be referred to as user keys. User keys may be unique to each user and may be stored in encryption key store 230.

Encryption key store 230 may be a database or other data store that stores user keys and user IDs in a manner that associates a user key with each user ID. Accordingly, a user key can be identified for a given user ID. For example, for the user ID "P1," encryption key store 230 may store the corresponding user key "K1," and, for the user IDs "P2," the encryption key store 230 may store the corresponding user key "K2." This association may also be referred to as a mapping between the user IDs and their corresponding user keys. For example, the user ID store 220 may have a database table in which a row of the table has a user ID and the associated encryption key. In some examples, the encryption key store 230 may be an archive storage service, such as an AWS S3 Vault.

The encryption key store 230 may be accessible by the routing application 210 and the data access agents 241, 242, 243 for purposes of retrieval of the user keys. The routing application 210 may receive a request to retrieve, store, or modify user-specific data, that originated from one of the clients 121, 122, and 123, or from the main application 205 on behalf of the client. Upon receiving this request, the routing application 210 may first retrieve, from the user ID store 220, the user ID corresponding to the authentication protocol identifier included in the request, and then retrieve the corresponding user key using the retrieved user ID. Upon retrieval of the user key, the routing application 210 may generate a hash of the user key and add the hash to the payload signature of the request. The routing application 210 may identify the appropriate data access agent specific to the user and invoke that data access agent using the request. The routing application 210 may identify the appropriate data access agent based on a mapping between data access agents and user IDs. This mapping may be stored in the routing application 210 (e.g., specified in the configuration setting of the routing application 210) or in a data store that is accessible by the routing application 210.

Each of the data access agents 241, 242, and 243 may be configured to retrieve the user key for the corresponding user ID. Since the data access agents 241, 242, and 243 are user-specific, each of the data access agents 241, 242, and 243 may know the user ID of the client that is intended to service. The data access agent may retrieve the corresponding user key using the user ID that is known to the data access agent. Using the retrieved user key, the data access agent may verify the hash included in the payload signature of a request that is received from the routing application 210, to confirm that the request was intended for that data access agent. For example, the data access agent may generate its own hash of the user key using the same hash function used by the routing application 210, and confirm that the hash generated with the retrieved user key is the same as the hash generated by the routing application 210.

After verification of the hash, the data access agent may perform the requested operation. If the requested operation was to retrieve user data, the data access agent may return the data to routing application 210, which may then return the data to the main application 205. If the data was requested by the client, then the main application 205 may transmit the data to the client over network 130.

In some examples, a symmetric encryption may be used in place of or in addition to the aforementioned hash. For example, the routing application 210 may encrypt some data using the retrieved user key, to obtain an encryption that is added to the payload signature. Subsequently, in place of or in addition to the verification of the hash, the data access agent may decrypt the encryption using the retrieved user key, and verify that the encryption was encrypted using that key.

The data access agents 241, 242, and 243 may be configured to be incapable of retrieving the user key of any user other than the corresponding user. For example, the user ID that is used for retrieval of the encryption key may be a fixed parameter for each of the data access agents 241, 243, and 243.

The data access agents 241, 242, and 243 may be configured to perform the requested operation (e.g., retrieving, writing, modifying, or retrieving user data) only if the hash (and/or encryption) in the payload signature is successfully verified. Accordingly, if the routing application 210 invokes the wrong data access agent, the invoked data access agent does not proceed with the requested operation.

In some embodiments, the data that is stored in the data stores 141, 142, and 143 may be encrypted using the corresponding user key. In such embodiments, the data access agents 241, 242, and 243 that respectively access the data stores 141, 142, and 143 may encrypt any data that is stored in the data stores 141, 142, and 143 using the respective user key, and decrypt any data retrieved from the data stores 141, 142, and 143 using the user key.

Additional aspects of the architecture illustrated in FIG. 2 are described below with reference to FIGS. 3 and 4.

Figure 3:
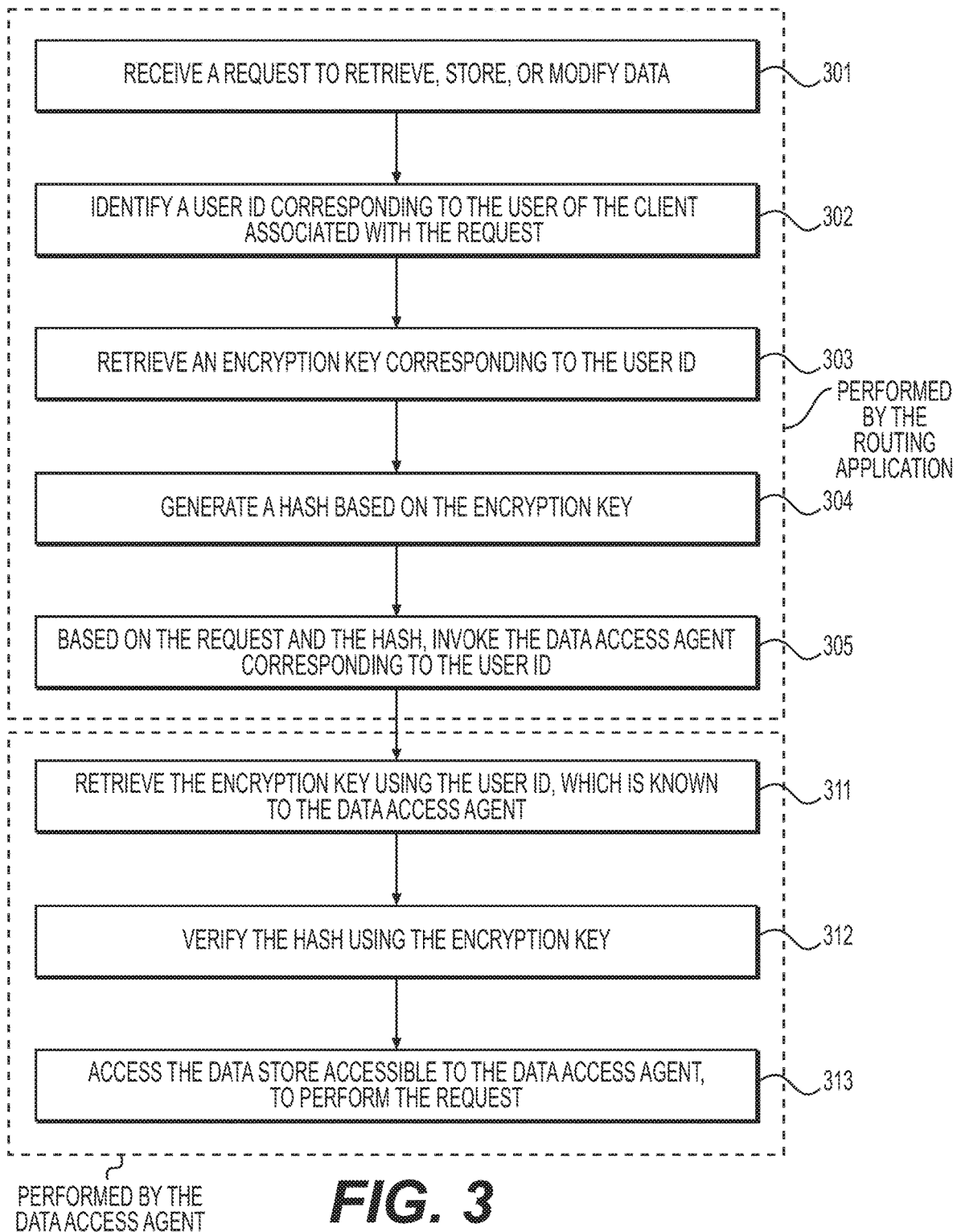
FIG. 3 depicts a flowchart of a method for secure data access control, according to one or more embodiments.

FIG. 3 is a flowchart illustrating a method of using the architecture illustrated in FIG. 2. Steps 301 through 305 may be performed by the routing application 210, while steps 311 through 313 may be performed by one of the data access agents 141, 142 and 143.

Step 301 may include receiving a request to retrieve, store or modify data. For example, the request may be received from client 121 operated by user 151. The request may be transmitted through the access point 112 and main application 205 to the routing application 210. A request received from client 121 to retrieve, store or modify data may be a request to retrieve data that is hosted by the computer system 110, a request to store data in the computer system 110, and/or a request to modify (e.g., overwrite or delete) data that is hosted by the computer system 110. Alternatively, the request may be generated by the main application 205 in response to another request received from the client 121. In either case, the request may include an authentication protocol identifier used by client 121 for communicating with the computer system 110, and the routing application 210 may understand the request as requiring access to one of data stores through the appropriate data access agent.

Step 302 may include identifying a user ID corresponding to the user of the client associated with the request. The client associated with the request may be the client who sent the request, or the client on behalf of which the request was generated by the main application 205. For example, the routing application 210 may detect the authentication protocol identifier (e.g., "e483192a814d11e8adc") that is included in the request, and retrieve the corresponding user ID (e.g., "P1") from user ID data store 220 using the authentication protocol identifier.

Step 303 may include retrieving an encryption key corresponding to the user ID. For example, the routing application 210 may use user ID "P1" retrieved in step 302 to retrieve the corresponding user key (e.g., "K1") from the encryption key store 230.

Step 304 may include generating a hash based on the encryption key. For example, the routing application 210 may generate a hash as a function of the user key "K1" retrieved in step 303. The function used to generate the hash may be available to the data access agents 241, 242 and 243.

Step 305 may include invoking the data access agent corresponding to the user ID, based on the request and the hash. For example, the routing application 210 may add the hash to the payload signature of the request, identify data access agent 241 as corresponding to the user ID, and invoke the data access agent 241 using the request with the hash having been added to the payload signature. The routing application 210 may identify the data access agent 241 based on a correspondence between data access agent 241 and the user ID that is recorded in the routing application 210.

Steps 311 through 313 may be performed by the data access agent invoked in step 305. Step 311 may include retrieving the encryption key that was retrieved in step 304, using the user ID that is known to the data access agent 241. For example, data access agent 241 may be configured with the user ID "P1" as a predefined parameter. Upon being invoked by the routing application, data access agent 241 may use the predefined user ID to retrieve the user key "K1" from the encryption key store 230.

Step 312 may include verifying the hash using the encryption key. For example, the data access agent 241 may generate a hash as a function of the user key "K1" retrieved in step 311. The hash function may be the same as the one used in step 304. Accordingly, the data access agent 241 may verify the hash in the payload signature by confirming that the hash generated by data access agent 241 matches the hash generated by the routing application 210.

Step 313 may include accessing the data store accessible to the data access agent, to perform the request. For example, the data access agent 241, upon having verified the hash in the payload signature, may perform the requested operation. As noted earlier, the requested operation may be, for example, retrieving data from data store 141, storing data in data store 141, and/or modifying data that is stored in data store 141. In the case of retrieving data from data store 141, the data access agent 241 may return the data to the routing application 210. Additionally, if the data retrieved from data store 141 was encrypted using the user key "K1," the data access agent 241 may decrypt the data prior to returning the data to the routing application 210. In the case of storing data in data store 141, the data to be stored may be included in the payload of the request, and the data access agent 241 may encrypt the data to be stored using user key "K1," before storing the data in data access agent 241. In the case of modifying data stored in data store 141, the data access agent 241 may modify the data according to the request.

The method of FIG. 3 may be performed for different clients that are operated by different respective users. For example, if the method were performed for client 122, then data store 142 and data access agent 242 would be involved, rather than data store 141 and data access agent 241. Therefore, if the computer system 110 receives a plurality of data respectively from clients 121, 122, and 123, then computer system may use data access agents 241, 242, and 243 to respectively store the plurality of data objects in data stores 141, 142, and 143.

Figure 4:
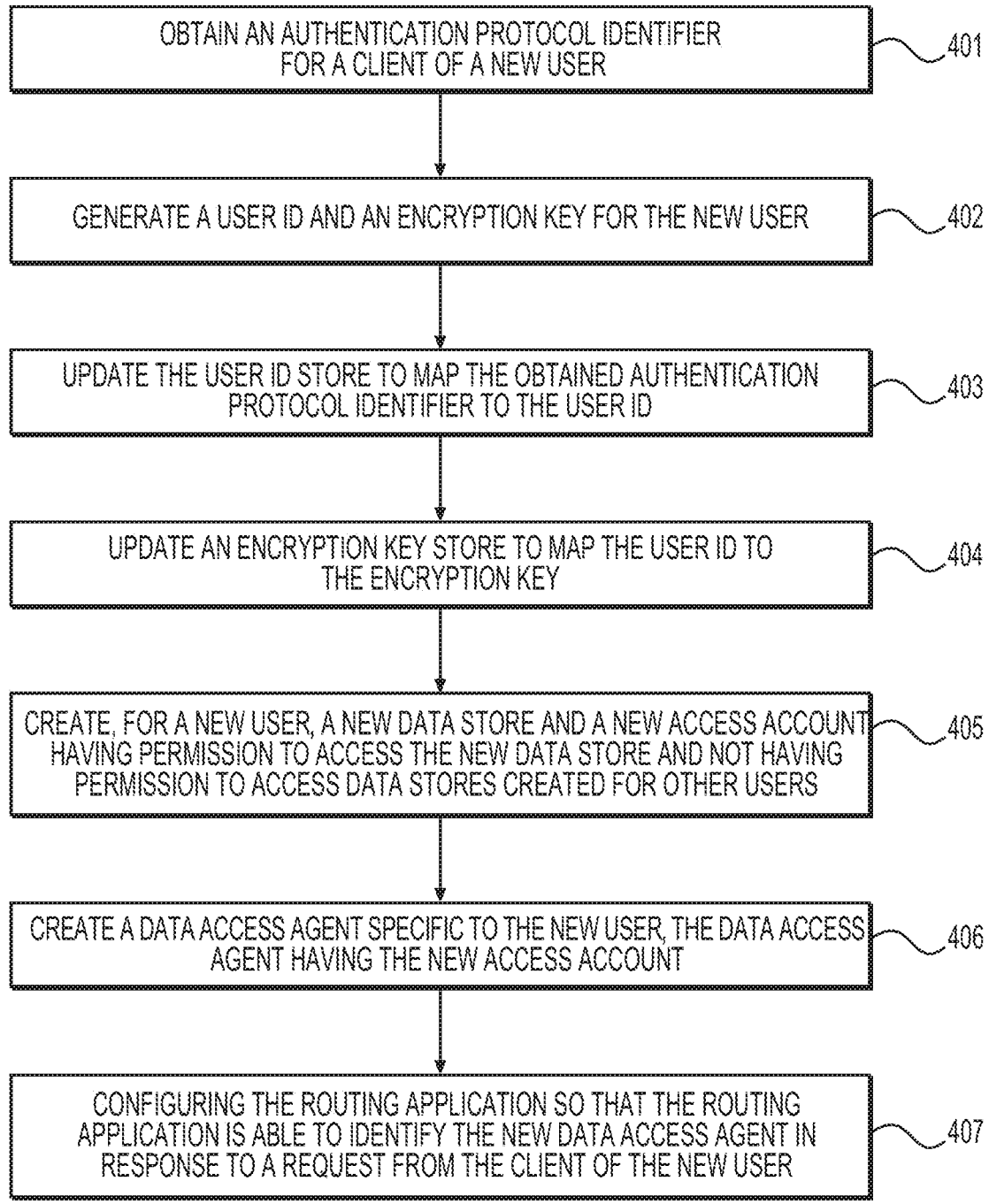
FIG. 4 depicts a flowchart of a method for secure data access control, according to one or more embodiments.

FIG. 4 illustrates a method for adding a new user. Each step in the method may be performed by the computer system 110.

Step 401 may include obtaining an authentication protocol identifier that identifies a client (e.g., client device or client system) of a new user. For example, the access point 112 or the main application 205 may instigate an authentication process with the client, so as to result in the creation of an authentication protocol identifier.

Step 402 may include generating a user ID and an encryption key for the new user. This step may include generating a new user ID and a new user key that are respectively different from all existing user IDs and user keys.

Step 403 may include updating the user ID store to map the authentication protocol identifier to the user ID. For example, user ID store 220 may be updated so that the assigned user ID is identifiable given the authentication protocol identifier obtained in step 401.

Step 404 may include updating an encryption key store to map the user ID to the encryption key. For example, encryption key store 230 may be updated so that the assigned user key is identifiable given the newly assigned user ID.

Step 405 may include creating, for the new user, a new data store and a new access account having permission to access the new data store and not having permission to access data stores created for other users. The new data store may have any of the characteristics described above for data stores 141, 142, and 143. The new access account may have any of the characteristics described above for access accounts for data stores 241, 242, and 243.

Step 406 may include creating a data access agent specific to the new user. The data access agent may have the new access account created in step 405, such that the data access agent has permission to access the new data store and but does not have permission to access data stores for other users. The newly created data access agent may have any of the characteristics described above for the data access agents 21, 242, and 243.

Step 407 may include configuring the routing application so that the routing application is able to identify the new data access agent in response to a request from the client of the new user. This step may include updating a mapping between data access agents and user IDs. This mapping may be stored in the routing application 210 or a storage resource that is accessible by the routing application 210.

Subsequent to the method illustrated in FIG. 4, the newly added user may request storage of data into the configured data store, or retrieval or modification of any data stored in the data store, in accordance with the method illustrated in FIG. 3.

According to the secure data access control architecture described in this disclosure, effective isolation of data stored for different users may be realized in multi-tenant architectures, thereby improving data security. Furthermore, in the secure access control architecture described in this disclosure, data that is stored in any of the isolated data stores may be rendered inaccessible by revoking access accounts for isolated stores or user key.

In general, any process discussed in this disclosure that is understood to be computer-implementable, such as the processes illustrated in FIGS. 3-4, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110, may include one or more computing devices. If the one or more processors of the computer system 110 are implemented as a plurality of processors, the plurality of processors may be included in a single computing device or distributed among a plurality of computing devices. If a computer system 110 comprises a plurality of computing devices, the memory of the computer system 110 may include the respective memory of each computing device of the plurality of computing devices.

Figure 5:
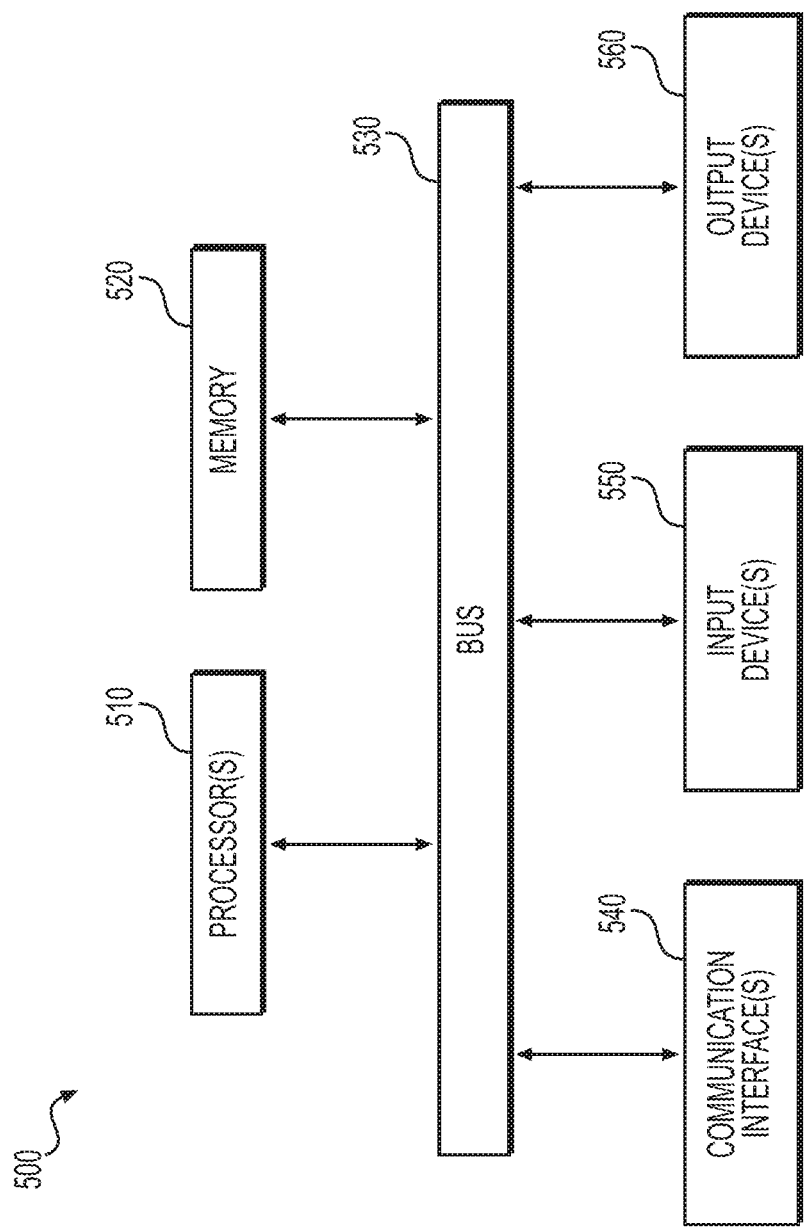
FIG. 5 depicts a computing device, according to one or more embodiments.

FIG. 5 illustrates an example of a computing device 500 of a computer system, such as computer system 110. The computing device 500 may include processor(s) 510 (e.g., CPU, GPU, or other such processing unit(s)), a memory 520, and communication interface(s) 540 (e.g., a network interface) to communicate with other devices. Memory 520 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 520. The computing device 500 may, in some embodiments, further include input device(s) 550 (e.g., a keyboard, mouse, or touchscreen) and output device(s) 560 (e.g., a display, printer). The aforementioned elements of the computing device 500 may be connected to one another through a bus 530, which represents one or more busses. In some embodiments, the processor(s) 510 of the computing device 500 include both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer system for secure data access control, comprising:
   a memory storing instructions; and
   one or more processors configured to execute the instructions to perform operations including:
      receiving, by a main application, first data from a first client associated with a first user;
      receiving, by a routing application, a first request to store the first data in a first data store;
      sending, by the routing application, the first data from the main application to a first data access agent, wherein the main application and the routing application do not have direct access to the first data store, the first data access agent being an application or process and having a first access account, the first access account permitting the first data access agent to access the first data store and not permitting the first data access agent to access a second data store;
      based on the first request, retrieving, by the first data access agent from an encryption key store, a first encryption key using a first identifier associated with the first user;
      verifying, by the first data access agent, a first hash of the first encryption key generated by the routing application using the first encryption key;
      when the first data access agent has verified the first hash, storing, by the first data access agent, the first data in the first data store based on the first request;
      receiving, by the main application, second data from a second client associated with a second user;
      receiving, by the routing application, a second request to store the second data in the second data store;
      sending, by the routing application, the second data from the main application to a second data access agent, wherein the main application and the routing application do not have direct access to the second data store, the second data access agent being an application or process having a second access account, the second access account permitting the second data access agent to access the second data store and not permitting the second data access agent to access the first data store;
      based on the second request, retrieving, by the second data access agent from the encryption key store, a second encryption key using a second identifier associated with the second user;
      verifying, by the second data access agent, a second hash of the second encryption key generated by the routing application using the second encryption key;

when the second data access agent has verified the second hash, storing, by the second data access agent, the second data in the second data store based on the second request,
wherein the routing application is a compute configured to invoke the first and second data access agents, and wherein the routing application has an access account without permission to access the first and second data stores, and
wherein the first access account has a set of identity access management (IAM) permissions permitting access to the first data store and not permitting access to the second data store.

2. The computer system of claim 1, wherein the storing the first data includes, by the first data access agent:
encrypting the first data using the first encryption key; and
storing the encrypted first data in the first data store.

3. The computer system of claim 2, wherein the operations further include:
receiving, by the routing application, a request to retrieve the first data from the first client; and
based on the request, retrieving, by the routing application, the first data using the first data access agent.

4. The computer system of claim 3, wherein the retrieving, by the routing application, the first data includes:
retrieving, by the routing application, the first encryption key from the encryption key store;
generating, by the routing application, the hash of the encryption key and
invoking, by the routing application, the first data access agent, so that the first data access agent retrieves the first encryption key from the encryption key store, verifies the first hash using the first encryption key, and decrypts the first data.

5. The computer system of claim 4, wherein the retrieving, by the routing application, the first encryption key includes:
determining, by the routing application, the first identifier associated with the first user based on the request; and
retrieving, by the routing application, the first encryption key from the encryption key store based on the first identifier.

6. The computer system of claim 1, wherein
the first and second data access agents are respectively associated with the first and second users,
the operations further include receiving, by the main application, from the first client, a request to store the first data in the computer system,
sending, by the routing application, the first data from the main application to the first data access agent, and
wherein the storing, by the first data access agent, the first data includes:
determining, by the routing application, that the request originated from the first user;
determining, by the routing application, that the first data access agent is associated with the first user; and
invoking, by the routing application, the first data access agent upon determining that the request is associated with the first user.

7. The computer system of claim 1, wherein
each of the first data store and the second data store is a cloud storage resource, and
each of the first data access agent and the second data access agent is a serverless compute.

8. The computer system of claim 1, wherein the main application and the routing application are separate applications.

9. The computer system of claim 1, wherein the first data access agent has access to only encryption keys in the encryption store that are associated with the first identifier associated with the first user.

10. The computer system of claim 1, wherein the operations further include:
retrieving, by the routing application from the encryption key store, the first encryption key corresponding to the first identifier associated with the first user;
generating, by the routing application, the first hash based on the first encryption key.

11. The computer system of claim 10, wherein the first hash is generated using a first hash function of the first encryption key, and wherein the verifying, by the first data access agent, the first hash includes:
generating, by the first data access agent, a new first hash of the first encryption key using the first hash function;
comparing, by the first data access agent, the new first hash to the first hash generated by the routing application; and
if the new first hash generated by the first data access agent matches the first hash generated by the routing application, verifying, by the first data access agent, the first hash generated by the routing application.

12. The computing system of claim 11, wherein the operations further include:
retrieving, by the routing application from the encryption key store, the second encryption key corresponding to the second identifier associated with the second user; and
generating, by the routing application, the second hash based on the second encryption key using a second hash function of the second encryption key,
wherein the verifying, by the second data access agent, the second hash includes:
generating, by the second data access agent, a new second hash of the second encryption key using the second hash function;
comparing, by the second data access agent, the new second hash to the second hash generated by the routing application; and
if the new second hash generated by the second data access agent matches the second hash generated by the routing application, verifying, by the second data access agent, the second hash generated by the routing application.

13. A computer-implemented method for secure data access control, comprising:
receiving, by a main application, a request to retrieve data from a client associated with a user;
based on the request, determining, by a routing application, an identifier of the user;
based on the identifier, identifying, from a plurality of data access agents by the routing application, a data access agent having permission to access a data store in which the data is stored, the data access agent being an application or process and having an access account, the access account having a set of identity access management (IAM) permissions permitting the data access agent to access the data store and not permitting the data access agent to access data stores accessible to other data access agents of the plurality of data access agents, wherein the routing application is a compute configured to invoke the data access agent and the routing application has an access without permission to access the data store such that the routing application does not have direct access to the data store;

invoking, by the routing application, the identified data access agent so that the identified data access agent:
retrieves, from an encryption key store, an encryption key corresponding to the identifier of the user;
verifies a hash of the encryption key generated by the routing application using the encryption key;
when the hash has been verified, retrieves the data from the data store, the invoking including providing, by the routing application, the data access agent with a request to retrieve the data; and
decrypts the retrieved data;
sending, by the routing application, the retrieved data from the identified data access agent to the main application; and
transmitting, by the main application, the retrieved data to the client.

14. The method of claim 13, further comprising:
retrieving, by the routing application, from the encryption key store, the encryption key corresponding to the identifier; and
generating, by the routing application, the hash of the encryption key.

15. The method of claim 14, wherein, of the plurality of data access agents, only the identified data access agent has access to the encryption key corresponding to the identifier.

16. The method of claim 15, wherein the identified data access agent does not have access to encryption keys corresponding to identifiers of other users.

17. The method of claim 14, wherein the hash is generated using a hash function of the encryption key, and wherein the verifying the hash includes the identified data access agent:
generating a new hash of the encryption key using the hash function;
comparing the new hash to the hash generated by the routing application; and
if the new hash generated by the data access agent matches the hash generated by the routing application, verifying the hash generated by the routing application.

18. The method of claim 13, wherein
the data store is a cloud storage resource, and
each of the plurality of data access agents is a serverless compute.

19. The method of claim 13, wherein the main application and the routing application are separate applications.

20. A computer system for secure data access control, comprising:
a memory storing instructions; and
one or more processors configured to execute the instructions to perform operations including:
generating, by a main application, a user-specific identifier for a user;
creating, by the main application, a data store and an access account that has a set of identity access management (IAM) permissions to access the data store and does not have permission to access data stores created for other users;
creating, by the main application, a user-specific data access agent corresponding to the user, the data access agent being an application or process, the data access agent having the access account and being one of a plurality of data access agents;
receiving, by the main application, a request to store data from a client associated with the user;
based on the request, determining, by a routing application, an identifier of the user as being the user-specific identifier, wherein the routing application is a compute configured to invoke the data access agent and the routing application has an access account without permission to access the data stores such that the main application and the routing application do not have direct access to the data store;
based on the user-specific identifier, identifying, from the plurality of data access agents by the routing application, the user-specific data access agent;
invoking, by the routing application, the user-specific data access agent so that the user-specific data access agent:
retrieves, from an encryption key store, an encryption key corresponding to the user-specific identifier;
verifies a hash of the encryption key generated by the routing application using the encryption key;
when the hash has been verified, encrypts the data; and
stores the data in the data store, the invoking including providing the data access agent with a request to retrieve the data.

* * * * *